US010270081B2

(12) United States Patent
Gouzin et al.

(10) Patent No.: US 10,270,081 B2
(45) Date of Patent: Apr. 23, 2019

(54) PROTECTIVE BATTERY CASING

(71) Applicants: SPARK RACING TECHNOLOGY SAS, Villeneuve-la-Guyard (FR); DALLARA AUTOMOBILI SPA, Varano de' Melegari (IT)

(72) Inventors: Theophile Gouzin, Villeneuve-la-Guyard (FR); Luca Pignacca, Varano de' Melegari (IT)

(73) Assignees: SPARK RACING TECHNOLOGY SAS, Villeneuve-la-Guyard (FR); DALLARA AUTOMONILI SPA, Varano de' Melegari (IT)

( * ) Notice: Subject to any disclaimer, the term of this patent is extended or adjusted under 35 U.S.C. 154(b) by 274 days.

(21) Appl. No.: 15/113,291

(22) PCT Filed: Jan. 23, 2015

(86) PCT No.: PCT/EP2015/051420
§ 371 (c)(1),
(2) Date: Jul. 21, 2016

(87) PCT Pub. No.: WO2015/110613
PCT Pub. Date: Jul. 30, 2015

(65) Prior Publication Data
US 2017/0012275 A1    Jan. 12, 2017

(30) Foreign Application Priority Data
Jan. 23, 2014   (EP) ..................................... 14305099

(51) Int. Cl.
*H01M 2/34* (2006.01)
*H01M 2/10* (2006.01)

(52) U.S. Cl.
CPC ............. *H01M 2/347* (2013.01); *H01M 2/10* (2013.01); *H01M 2/1072* (2013.01); *H01M 2200/00* (2013.01); *H01M 2220/20* (2013.01)

(58) Field of Classification Search
None
See application file for complete search history.

(56) References Cited

U.S. PATENT DOCUMENTS 4,505,977 A     3/1985  Hasenauer et al.
5,143,803 A *   9/1992  Andres ............... H01M 2/1094
                                                429/120

(Continued)

FOREIGN PATENT DOCUMENTS

EP           0149090 A1     7/1985
WO     WO 2004064082 A2    7/2004

OTHER PUBLICATIONS

International Search Report dated Mar. 23, 2015, for International Patent Application No. PCT/EP2015/051420.

(Continued)

*Primary Examiner* — Eli S Mekhlin
(74) *Attorney, Agent, or Firm* — Karceski IP Law, PLLC

(57) ABSTRACT

A casing has an interior space in which a battery can be fitted. The casing comprises a plurality of walls that encapsulate the interior space. A wall comprises an assembly of wall elements arranged as layers. This wall assembly includes a protective wall element comprising electrically conductive material, such as, for example, carbon fibers. The wall assembly further includes a set of electrically insulating wall elements located between the protective wall element and the interior space.

14 Claims, 2 Drawing Sheets

(56) References Cited

U.S. PATENT DOCUMENTS

| | | | | |
|---|---|---|---|---|
| 2006/0068278 A1* | 3/2006 | Bloom | ............... | H01B 3/025 |
| | | | | 429/176 |
| 2010/0247990 A1* | 9/2010 | Ugaji | ............... | H01M 2/0202 |
| | | | | 429/94 |
| 2012/0100414 A1* | 4/2012 | Sonta | ............... | H01M 2/1072 |
| | | | | 429/163 |

OTHER PUBLICATIONS

International Preliminary Report on Patentability dated Jan. 8, 2016, for International Patent Application No. PCT/EP2015/051420.

* cited by examiner

PROTECTIVE BATTERY CASING

CROSS-REFERENCE TO RELATED APPLICATION(S)

This is a National Stage Entry into the United States Patent and Trademark Office from International PCT Patent Application No. PCT/EP2015/051420, having an international filing date of Jan. 23, 2015, which claims priority to European Patent Application No. EP 14305099.5, filed Jan. 23, 2014, the entire contents of both of which are incorporated herein by reference.

FIELD OF THE INVENTION

An aspect of the invention relates to a casing having an interior space in which a battery can be fitted. The casing may be included in, for example, a vehicle for housing a battery capable of electrically propelling the vehicle. Other aspects of the invention relate to an assembly comprising a casing and a battery fitted within the casing, and to an electrically propelled vehicle.

BACKGROUND OF THE INVENTION

A vehicle, such as, for example, a car, may be propelled electrically. This requires the vehicle to have an electrical energy source, which is typically in the form of a battery. The battery may be fitted in a protective casing that provides fire protection. There may be a risk that the battery catches fire if, for example, the battery is overcharged or malfunctions otherwise. The protective casing may prevent this fire from reaching combustible material in the vehicle, or even explosive material such as, for example, fuel.

A protective battery casing should preferably be lightweight for reasons of, for example, power efficiency. Light weight may also contribute to performance, in terms of speed and acceleration. Carbon fiber-based composites are relatively lightweight and relatively heat resistant, and also relatively strong and stiff. A protective battery casing may thus comprise carbon fiber-based composites. For example, a protective battery casing may comprise walls that have a layered structure including carbon fibers in epoxy resin.

SUMMARY OF THE INVENTION

There is a need for a solution that alto is satisfactory protection against electrocution.

In order to better address this need, the following points have been taken into consideration. A battery in an electrically propelled vehicle may provide a relatively high output voltage, which could electrocute a person if he or she were to contact an element receiving this high output voltage. A carbon fiber-based composite may provide some electrical insulation although carbon fibers are electrically conductive. For example, carbon fibers may be embedded in epoxy resin, which can be considered as an electrically insulating material.

However, a protective battery casing comprising carbon fibers, or another conductive material, may get damaged in, for example, an accident. A wall of the protective battery casing may structurally degrade such that some carbon fibers are at least partially denuded, that is, are no longer embedded in epoxy resin or other insulating material. These denuded carbon fibers may contact the battery directly, or indirectly through a conductive element that electrically contacts the battery. A person who touches the protective battery casing may thus risk touching denuded carbon fibers that electrically contact the battery. These touchable carbon fibers may therefore be under relatively high voltage. There is thus risk of electrocution.

In accordance with an aspect of the invention, there is provided a casing having an interior space in which a battery can be fitted, the casing comprising a plurality of walls that encapsulate the interior space, whereby a wall comprises an assembly of wall elements arranged as layers, the assembly including:
 a protective wall element comprising electrically conductive material; and
 a set of electrically insulating wall elements located between the protective wall element and the interior space and bounding the interior space, the set of electrically insulating wall elements comprising:
 a flexible electrically insulating wall element; and
 a rigid electrically insulating wall element located between the flexible electrically insulating wall element and the interior space, so that the flexible electrically insulating wall element is sandwiched between the protective wall element and the rigid electrically insulating wall element.

Other aspects of the invention concern an assembly comprising a casing as defined hereinbefore and a battery fitted within this casing. Yet another aspect of the invention concerns an electrically propelled vehicle comprising a casing as defined hereinbefore.

In each of these aspects, the set of electrically insulating wall elements provides protection against electrocution following, for example, an accident as described hereinbefore. Moreover, the set of electrically insulating wall elements provide protection against a dielectric breakdown in the casing, which also presents a risk of electrocution. In addition, the set of electrically insulating wall elements may prevent a short circuit in the battery if, for example, a battery cell breaks away due to, for example, a shock. The battery cell will collide with the set of electrically insulating wall elements, rather than with a conductive part that could cause a short circuit.

An embodiment of the invention may comprise one or more additional features defined in the dependent claims, which are appended to the description.

For the purpose of illustration, a detailed description of some embodiments of the invention is presented with reference to accompanying drawings.

DETAILED DESCRIPTION

Figure 1:
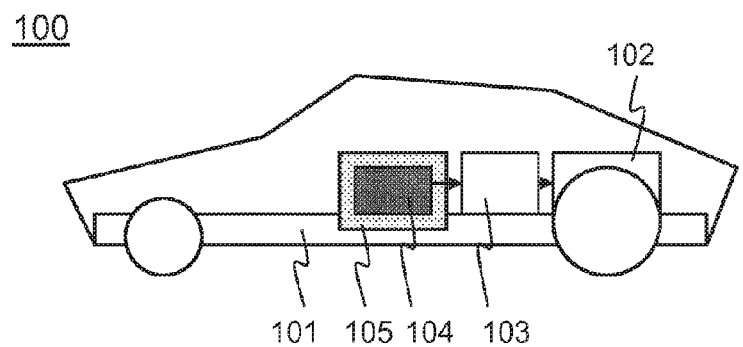
FIG. 1 is a block diagram of an electrically propelled vehicle comprising a casing in which a battery can be fitted.

FIG. 1 schematically illustrates an electrically propelled vehicle 100, which is represented in a block diagram. The electrically propelled vehicle 100 comprises a chassis 101, a wheel drive mechanism 102, an electric motor 103, and a battery 104 that is fitted in a casing 105. The casing 105 may form a structural part of the chassis 101 of the electrically propelled vehicle 100.

The electrically propelled vehicle 100 basically operates as follows. The electric motor 103 draws electrical power from the battery 104, which is fitted in the casing 105. This allows the electric motor 103 to deliver mechanical power to the wheel drive mechanism 102, which may set the electrically propelled vehicle 100 in motion, or may keep the electrically propelled vehicle 100 in motion.

There is a risk that the electrically propelled vehicle 100 is involved in an accident. The casing 105 should therefore preferably be resistant against shock and penetration of objects, which may hit the casing 105 in an accident. Yet, the casing 105 should preferably be lightweight for reasons of, for example, power efficiency. Light weight also contributes to performance, in terms of speed and acceleration.

In particular, there is a risk of electrocution when the battery 104 provides a relatively high output voltage. For example, the battery 104 may comprise 150 lithium-ion cells arranged in series. Such a cell may provide an output voltage of approximately 3 volt. This implies that the battery 104 may provide an output voltage in the range of, for example, 300 to 1000 volt.

Figure 2:
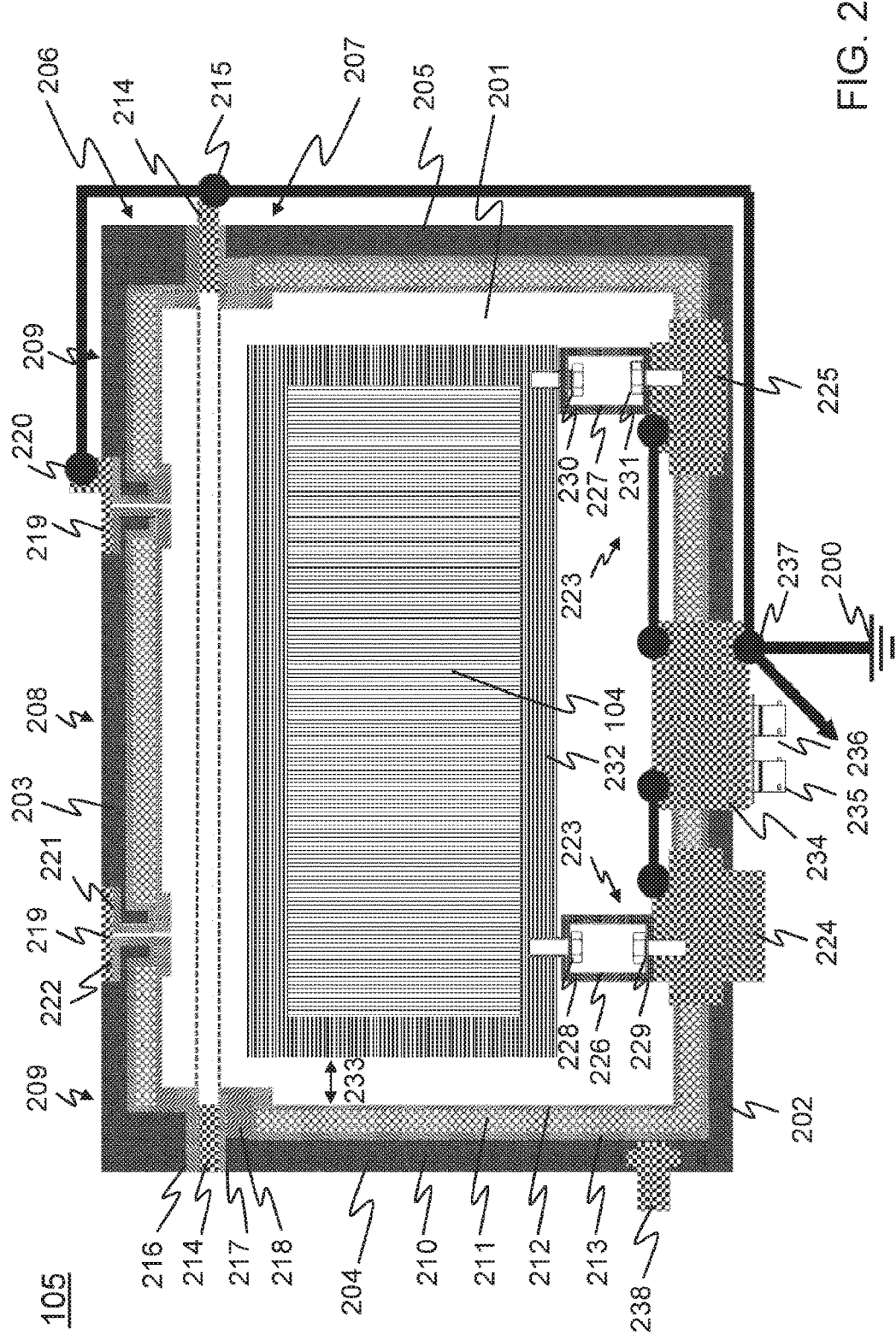
FIG. 2 is a schematic cross-sectional diagram of the casing.

FIG. 2 schematically illustrates the casing 105. The casing 105 is represented in a cross-sectional diagram. The casing 105 provides satisfactory protection against electrocution, in addition to being resistant against shock and penetration of objects.

The casing 105 has an interior space 201 in which the battery 104 can be fitted. The casing 105 comprising a plurality of walls 202-205 that encapsulate the interior space 201. These walls include a bottom wall 202, a top wall 203, and two side walls 204, 205, which will be referred to individually as left side wall 204 and right side wall 205 for reasons of convenience. There may be two further side walls, a front wall and a rear wall, which are not visible in FIG. 2.

The top wall 203 forms a primary lid part 206 of the casing 105, which is detachably fastened to a primary lid receiving part 207 that includes the bottom wall 202 and the two side walls 204, 205. The top wall 203 comprises a secondary lid part 208 and a secondary lid receiving part 209, which are detachably fastened to each other. In fact, the secondary lid part 208 is a lid-forming portion of the top wall 203. The secondary lid receiving part 209 is a remaining, lid receiving portion of the top wall 203.

The left side wall 204 comprises an assembly of wall elements 210-213 arranged as layers. This assembly includes a protective wall element 210, which comprises electrically conductive material, and a set of electrically insulating wall elements 211, 212. The set of electrically insulating wall elements 211, 212 are located between the protective wall element 210 and the interior space 201. The others walls, including the bottom wall 202, the top wall 203, and right side wall 205 have a similar structure.

The protective wall element 210 should preferably be relatively lightweight for reasons mentioned hereinbefore. Yet, the protective wall element 210 should preferably confer sufficient mechanical strength to the casing 105, so that the casing 105 can be part of the chassis 101 of the electrically propelled vehicle 100 illustrated in FIG. 1. The chassis 101 should be able to resist to forces of acceleration and, to a certain extent, to forces that may occur in an accident.

The protective wall element 210 may be carbon fiber-based. For example, the protective wall element 210 may have a layered structure that includes carbon fibers. For example, the protective wall element 210 may comprise a core layer in the form of a honeycomb structure panel of relatively lightweight metal, such as, for example, aluminum, or an alloy. This core layer may be sandwiched between two carbon fiber layers that comprise carbon fibers embedded in a resin, such as, for example, an epoxy resin. Such a structure can indeed be relatively lightweight and provide sufficient mechanical strength.

The set of electrically insulating wall elements 211, 212 may comprise a flexible electrically insulating wall element 211 and a rigid electrically insulating wall element 212. The rigid electrically insulating wall element 212 is located between the flexible electrically insulating wall element 211 and the interior space 201. This implies that the flexible electrically insulating wall element 211 is sandwiched between the protective wall element 210 and the rigid electrically insulating wall element 212. This is a general structure of the set of electrically insulating wall elements 211, 212. In this general structure, the flexible electrically insulating wall element 211 may be thicker than the rigid electrically insulating wall element 212.

The flexible electrically insulating wall element 211 may comprise wool-like electrically insulating material, such as, for example, Calcium-Magnesium-Silicate wool, or Calcium-Magnesium-Zirconium-Silicate wool, or a combination of both. These examples of wool-like electrically insulating material are commercialized under the name "Superwool™", Superwool being a trademark of The Morgan Crucible Company plc.

The rigid electrically insulating wall element 212 may comprise electrically insulating fibers, such as, for example, glass fibers, or aramid fibers. A fiber of so-called S2 glass can be a suitable choice. "Kevlar®" is an example of a suitable aramid fiber, Kevlar being a registered trademark of E. I. du Pont de Nemours and Company or its affiliates.

The set of electrically insulating wall elements 211, 212 should be sufficiently thick to prevent dielectric breakdown. Dielectric breakdown, which causes arcing, may potentially occur due to the relatively high output voltage of the battery 104. The set of electrically insulating wall elements 211, 212 should therefore preferably have a thickness that is greater than a critical thickness at which a dielectric breakdown would occur if a maximum output voltage of the battery 104 were applied to the assembly of wall elements 210-213.

An appropriate thickness of the set of electrically insulating wall elements 211, 212 can be determined by means of a dielectric test. The standard IEC 60664-1: 2007 (incorporated herein by reference) defines a suitable dielectric test. Such a dielectric test can reveal a level of electrical insulation that the set of electrically insulating wall elements 211, 212 provides for a given thickness.

The assembly of wall elements 210-213 includes an EMC shield 213, EMC being an acronym of Electro Magnetic Compatibility. The casing 105 may include this particular shield because the protective wall element 210 may not provide sufficient EMC shielding, although this wall element comprises conductive material.

The EMC shield 213 is located between the protective wall element 210 and the set of electrically insulating wall elements 211, 212. The set of electrically insulating wall elements 211, 212 thus form a barrier between the EMC shield 213 and the battery 104. This prevents the EMC shield 213 from causing a short circuit in the battery 104 in case, for example, a battery cell breaks away from the battery 104 due to, for example, a shock. The battery cell will collide with the set of electrically insulating wall elements 211, 212, rather than with the EMC shield 213, or another conductive part that could cause a short circuit.

The EMC shield 213 may comprise an electrically conductive fabric. FIG. 2 illustrates an embodiment in which the various protective wall elements 210 are covered with the electrically conductive fabric on their respective inner sides.

The electrically conductive fabric may comprise fibers, such as, for example, polyester fibers coated with an electrically conductive material, such as, for example, Nickel.

The casing 105 comprises a primary interconnection member 214 that equipotentially bonds together the EMC shield 213 in the primary lid part 206, which is formed by the top wall 203, and the EMC shield 213 in the primary lid receiving part 207, which includes the two side walls 204, 205. The primary interconnection member 214 is provided with a primary shield connector 215. The primary shield connector 215 allows equipotentially bonding the primary interconnection member 214 to a ground terminal 200, as schematically illustrated in FIG. 2. The EMC shield 213 is thereby also equipotentially bonded to the ground terminal 200. Equipotential bonding is achieved by means of a conductive path having relatively low impedance, which typically involves use of relatively wide and thick conductive elements.

In more detail, the primary lid part 206 has a circumferential rim 216 over which the EMC shield 213 extends. The primary lid receiving part 207 also has a circumferential rim 217 over which the EMC shield 213 extends. FIG. 2 illustrates a state in which the primary lid part 206 and the primary lid receiving part 207 are fastened to each other. In this state, the circumferential rim 216 of the primary lid part 206 and the circumferential rim 217 of the primary lid receiving part 207 face each other.

The primary interconnection member 214 is sandwiched between the aforementioned extending portions of the EMC shield 213, which comprise the electrically conductive fabric in this example. The electrically conductive fabric on the circumferential rim 216 of the primary lid part 206 is pressed against the primary interconnection member 214. The same applies to the electrically conductive fabric on the circumferential rim 217 of the primary lid receiving part 207, which is also pressed against the primary interconnection member 214.

Near the circumferential rim 216 of the primary lid part 206, the set of electrically insulating wall elements 211, 212 may have a structure that is different from the general structure described hereinbefore. Near the circumferential rim 216, the set of electrically insulating wall elements 211, 212 may comprise the rigid electrically insulating wall element 212 only, as illustrated in FIG. 2. In the structure near the circumferential rim 216, the rigid electrically insulating wall element 212 is significantly thicker than in the general structure. This ensures a satisfactory degree of electrical insulation.

Near the circumferential rim 217 of the primary lid receiving part 207, the structure of the set of electrically insulating wall elements 211, 212 also differs from the general structure in a manner as described hereinbefore. It can be further noted that the circumferential rim 217 of the primary lid receiving part 207 comprises a flange-like extension 218 alongside the protective wall element 210 of the left side wall 204 and the right side wall 205. This flange like extension 218 may comprise a same material as the rigid electrically insulating wall element 212.

The casing 105 comprises a secondary interconnection member 219 that equipotentially bonds together the EMC shield 213 in the secondary lid part 208 and the EMC shield 213 in the secondary lid receiving part 209, which parts form part of the top wall 203. The secondary interconnection member 219 is provided with a secondary shield connector 220 that allows equipotentially bonding the secondary interconnection member 219 to a ground terminal 200, as schematically illustrated in FIG. 2.

The remarks hereinbefore with regard to the primary lid part 206 and the primary lid receiving part 207 also generally apply to the secondary lid part 208 and the secondary lid receiving part 209, respectively. The secondary interconnection member 219 may press against the conductive fabric that is present on a circumferential rim 221 of the secondary lid part 208, as well as against the conductive fabric that is present on a circumferential 222 of the secondary lid receiving part 209, as illustrated in FIG. 2.

The casing 105 comprises an interior fastening structure 223 to fasten the battery 104 within the interior space 201. The interior fastening structure 223 may comprise, for example, conductive base members 224, 225, studs 226, 227, screws 228-231, and battery cell supports 232, as illustrated in FIG. 2. The battery cell supports 232 may mechanically be interconnected with each other by means of screeds. The conductive base members 224, 225, studs 226, 227, screws 228-231 may be of metal. In this figure, two conductive base members 224, 225 are visible, which will be referred to individually as left conductive base member 224 and right conductive base member 225.

In this example, the left conductive base member 224 is fixed in a through hole in the bottom wall 202 and traverses this wall. This implies that an intermediate portion of the left conductive base member 224 is embedded in the assembly of wall elements 210-213 that form the bottom wall 202. The right conductive base member is fixed in a recess of the bottom wall 202; which implies that a bottom portion of this member 225 is embedded in the assembly of wall elements 210-213 that from the bottom wall 202.

The interior fastening structure 223 allows fastening a battery 104 within the interior space 201 so that there is a gap 233 of between the battery 104 and any of the walls that forms the casing 105. This gap 233 contributes to providing protection against electrocution. The gap 233 is preferably sufficiently wide to prevent a dielectric breakdown in a space between the battery 104 and any of the protective wall elements 210, or the electrically conductive fabric that forms the EMC shield 213. The gap 233 may be, for example, at least 1 millimeter (mm).

The casing 105 comprises a connector box 234 located in a through hole in the assembly of wall elements 210-213 that form the bottom wall 202. The connector box 234 comprises a set of connectors 236, 237 that allow electrically connecting the battery 104, which is fitted in the interior space 201 of the casing 105, to an electrical device exterior to the casing 105, such as, for example, the electric motor 103 of the electrically propelled vehicle 100 illustrated in FIG. 1.

The connector box 234 comprises a ground connector 237 that allows equipotentially bonding the connector box 234 to the ground terminal 200. The left conductive base member 224 and right conductive base member 225 are each equipotentially bonded to the connector box 234, as illustrated in FIG. 2. Consequently, these conductive base members 224, 225 are equipotentially bonded to the ground terminal 200 if the connector box 234 is equipotentially bonded to the ground terminal 200, as illustrated in FIG. 2.

The casing 105 comprises an exterior fastening member 238 that allows fastening the casing 105 to, for example, other structural elements that form part of the chassis 101 of the electrically propelled vehicle 101 illustrated in FIG. 1. The exterior fastening member 238 may be in the form of, for example, a mounting bush, which may have a threaded internal cylindrical wall. The exterior fastening member 238 may be electrically conductive because, for example, this element is made of metal.

The exterior fastening member 238 is anchored in the protective wall element 210. That is, a base portion of the exterior fastening member 238 is embedded in the protective wall element 210. A remaining portion of the exterior fastening member 238 protrudes outwardly from the casing 105 as illustrated in FIG. 2.

The fastening member 238 need not be equipotentially bonded to the signal ground terminal 200. This is because this element is relatively strongly electrically insulated from the battery 104, contrary to, for example, the conductive base members 224, 225. The set of electrically insulating wall elements 211, 212 provide protecting against an electrical contact between the fastening member 238 and the battery 104 in case of an accident.

Figure 3:
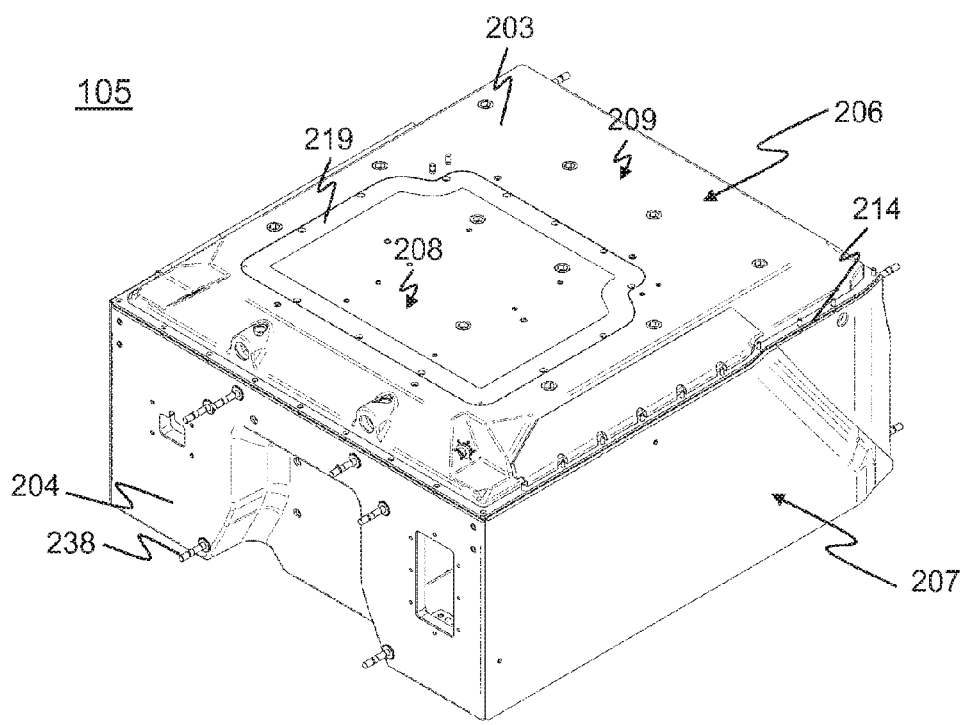
FIG. 3 is a schematic perspective view of the casing.

FIG. 3 provides a schematic perspective view of the casing 105. In this figure, like elements are denoted by like reference signs.

The detailed description hereinbefore with reference to the drawings is merely an illustration of the invention and the additional features, which are defined in the claims. The invention can be implemented in numerous different ways. In order to illustrate this, some alternatives are briefly indicated.

The invention may be applied in numerous types of products or methods that involve a battery fitted within a casing. For example, the invention may be applied in any type of battery powered structure or system, which need not be a vehicle. It should further be noted that the term "vehicle" should be understood in a broad sense. The term may embrace any type of propelled device, including devices capable of flying. The term "battery" should be understood in a broad sense. The term may embrace any type of electrical energy source that may potentially cause electrocution. The term "set of electrically insulating wall elements" should be understood in a broad sense. Such a set may comprise a single electrically insulating wall element only, such as for example, the rigid electrically insulating wall element described hereinbefore.

In general, there are numerous different ways of implementing the invention, whereby different implementations may have different topologies. In any given topology, a single module may carry out several functions, or several modules may jointly carry out a single function. In this respect, the drawings are very diagrammatic.

The remarks made hereinbefore demonstrate that the detailed description with reference to the drawings is an illustration of the invention rather than a limitation. The invention can be implemented in numerous alternative ways that are within the scope of the appended claims. All changes that come within the meaning and range of equivalency of the claims are to be embraced within their scope. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps. The mere fact that respective dependent claims define respective additional features, does not exclude combinations of additional features other than those reflected in the claims.

The invention claimed is:

1. A casing having an interior space for a battery, the casing comprising a plurality of walls that encapsulate the interior space, at least one wall of the plurality of walls comprising an assembly of wall elements arranged as layers, at least one of the assembly of wall elements comprising:

a protective wall element comprising electrically conductive material; and
a set of electrically insulating wall elements located between the protective wall element and the interior space and bounding the interior space, the set of electrically insulating wall elements comprising:
a flexible electrically insulating wall element; and
a rigid electrically insulating wall element located between the flexible electrically insulating wall element and the interior space, so that the flexible electrically insulating wall element is sandwiched between the protective wall element and the rigid electrically insulating wall element.

2. The casing according to claim 1, wherein the flexible electrically insulating wall element comprises wool-like electrically insulating material.

3. The casing according to claim 1, wherein the rigid electrically insulating wall element comprises electrically insulating fibers.

4. The casing according to claim 1, wherein the at least one of the assembly of wall elements further comprises:
an Electro Magnetic Compatibility (EMC) shield located between the protective wall element and the set of electrically insulating wall elements.

5. The casing according to claim 4, wherein the EMC shield comprises an electrically conductive fabric.

6. The casing according to claim 4, wherein the casing further comprises a lid part and a lid receiving part detachably fastened to each other, wherein the lid part and the lid receiving part comprise the EMC shield and an interconnection member equipotentially bonding the EMC shield in the lid part and the EMC shield in the lid receiving part.

7. The casing according to claim 6, wherein the interconnection member further comprises a shield connector equipotentially grounding the interconnection member.

8. The casing according to claim 1, further comprising an interior fastening structure fastening a battery within the interior space so that there is a gap between the battery and any of the plurality of walls of the casing.

9. The casing according to claim 8, the casing comprising a connector box at least partially located in a through hole in the at least one wall of the plurality of walls, the connector box comprising a set of connectors electrically connecting a battery disposable in the interior space of the casing to an electrical device exterior to the casing, the connector box comprising a ground connector for grounding the connector box.

10. The casing according to claim 9, wherein the interior fastening structure comprises a conductive base member of which at least a portion is embedded in the at least one wall of the plurality of walls, the conductive base member being equipotentially bonded to the connector box.

11. The casing according to claim 1, wherein the casing comprises an exterior fastening member that is electrically conductive, a base portion of the exterior fastening member being embedded in the protective wall element, whereby a remaining portion of the exterior fastening member protrudes outwardly from the casing.

12. An assembly comprising: a casing having an interior space, the casing comprising a plurality of walls that encapsulate the interior space, at least one wall of the plurality of walls comprising an assembly of wall elements arranged as layers, at least one of the assembly of wall elements comprising a protective wall element comprising electrically conductive material and a set of electrically insulating wall elements located between the protective wall element and the interior space and bounding the interior space, the set of electrically insulating wall elements comprising a flexible electrically insulating wall element and a rigid electrically insulating wall element located between the flexible electrically insulating wall element and the interior space, so that the flexible electrically insulating wall element is sandwiched between the protective wall element and the rigid electrically insulating wall element; and
- a battery fitted within the interior space of the casing, wherein the set of electrically insulating wall elements has a thickness that is greater than a critical thickness at which a dielectric breakdown occurs if a maximum output voltage of the battery is applied to the assembly of wall elements.

13. An electrically driven vehicle, comprising:
a chassis; and
a casing disposed on the vehicle body, the casing having an interior space for a battery, the casing comprising a plurality of walls that encapsulate the interior space, at least one wall of the plurality of walls comprising an assembly of wall elements arranged as layers, at least one of the assembly of wall elements comprising a protective wall element comprising electrically conductive material and a set of electrically insulating wall elements located between the protective wall element and the interior space and bounding the interior space, the set of electrically insulating wall elements comprising a flexible electrically insulating wall element and a rigid electrically insulating wall element located between the flexible electrically insulating wall element and the interior space, so that the flexible electrically insulating wall element is sandwiched between the protective wall element and the rigid electrically insulating wall element.

14. The electrically driven vehicle according to claim 13, wherein the casing forms a structural part of the chassis of the electrically driven vehicle.

* * * * *